United States Patent [19]

Morita et al.

[11] Patent Number: 4,509,236
[45] Date of Patent: Apr. 9, 1985

[54] BORING MACHINES

[75] Inventors: Seiichiro Morita; Akihiko Yuasa, both of Numazu; Takao Arai, Mishima, all of Japan

[73] Assignee: Toshiba Kikai Kabushiki Kaisha, Tokyo, Japan

[21] Appl. No.: 456,548

[22] Filed: Jan. 10, 1983

[51] Int. Cl.³ .............................................. B23B 39/00
[52] U.S. Cl. ...................................... 29/26 A; 82/1.5; 82/2 E; 408/147; 408/157; 408/180; 408/181
[58] Field of Search ............... 29/26 A; 408/146, 147, 408/148, 149, 150, 151, 157, 159, 180, 181, 187; 82/1.5, 2 E

[56] References Cited

U.S. PATENT DOCUMENTS

| 2,744,423 | 5/1956 | Edera et al. | 408/147 |
| 2,841,053 | 7/1958 | Horlacher | 82/1.5 |
| 3,237,486 | 3/1966 | Gilbert et al. | 408/181 |
| 3,290,965 | 12/1966 | Gaev et al. | 82/1.4 |
| 4,411,178 | 10/1983 | Wachs et al. | 82/2 E |

FOREIGN PATENT DOCUMENTS

| 2161683 | 6/1973 | Fed. Rep. of Germany | 82/1.5 |
| 255282 | 7/1926 | United Kingdom | 408/147 |
| 759243 | 8/1980 | U.S.S.R. | 408/180 |

*Primary Examiner*—Gil Weidenfeld
*Assistant Examiner*—Daniel W. Howell
*Attorney, Agent, or Firm*—Koda and Androlia

[57] ABSTRACT

A boring machine comprises a hollow rotary spindle, a pair of swing arms attached to the front end of the rotary spindle to extend in symmetric radial directions with respect to the rotary spindle, and a driving mechanism disposed within the rotary spindle for driving the swing arms. A pair of rams can be assembled respectively in the swing arms to be symmetrically movable in radial directions and a ram driving mechanism is also disposed in the rotary spindle. Cutters are supported to the front ends of the swing arms or rams.

1 Claim, 7 Drawing Figures

4,509,236

BORING MACHINES

BACKGROUND OF THE INVENTION

This invention relates to a boring machine having an improved boring spindle in which a pair of swing arms are rotated in a radial direction of the spindle, and a pair of rams are assembled in the respective swing arms to be movable in the radial direction.

In a known boring machine for cutting and working the inner surface of a workpiece, a cutter for cutting the workpiece is attached to the front end of a boring spindle and it is therefore necessary to change the cutter with another one every time when an operator wants to cut the workpiece by varying the radius of the cutter. Moreover, in a case where it is required to cut a splittable casing having a small inner diameter, two pieces of the splittable casing are independently worked and assembled into the casing after the working, so that in this case, when they are assembled, they may not be perfectly concentric in some case, thus degrading the working efficiency.

SUMMARY OF THE INVENTION

An object of this invention is to obviate defects encountered in the prior art and provide a boring machine in which a cutter to be supported at the front end of a spindle is rotated by a predetermined angle with a desired radius.

Another object of this invention is to provide a pair of swing arms secured to the front end of the spindle to be rotatable by a desired angle.

A further object of this invention is to provide a pair of rams accommodated in the respective swing arms and provided with cutters at their front ends so as to extend in a radial direction of the swing arms to cut a workpiece with a desired radius.

According to this invention there is provided a boring machine comprising a hollow rotary spindle, a pair of swing arms attached to a front end of the rotary spindle to extend in symmetric radial directions with respect to the rotary spindle and adapted to support cutters, and a driving mechanism disposed within the rotary spindle for driving the swing arms. In addition, according to this invention, a pair of rams can be assembled in the respective swing arms to be movable in radial directions of the swing arms so as to extend beyond the front ends of the swing arms and in this example, cutters are attached to the front ends of the rams.

DESCRIPTION OF THE PREFERRED EMBODIMENT

Figure 1:
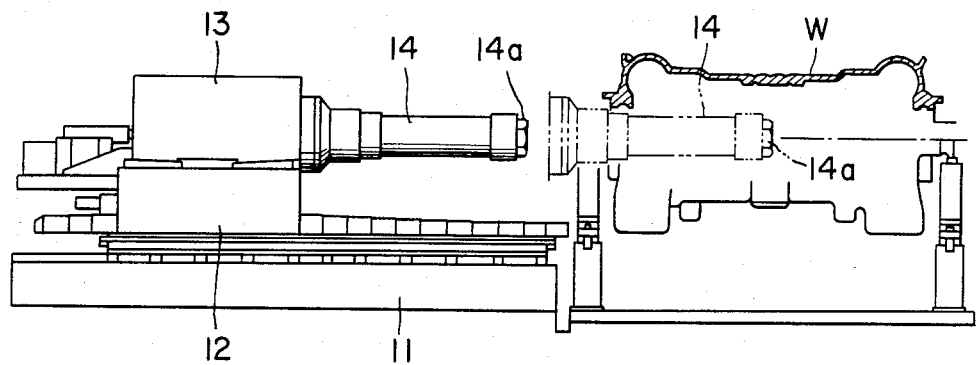
FIG. 1 is a schematic side view of a boring machine according to this invention.

Referring to FIG. 1, a saddle 12 is mounted on a bed 11 to be reciprocatable in a linear direction towards a workpiece W and a driving mechanism 13 is secured to the saddle 12. An elongated hollow cylindrical boring spindle 14 is attached to the driving mechanism 13 to be rotatable.

Figure 2:
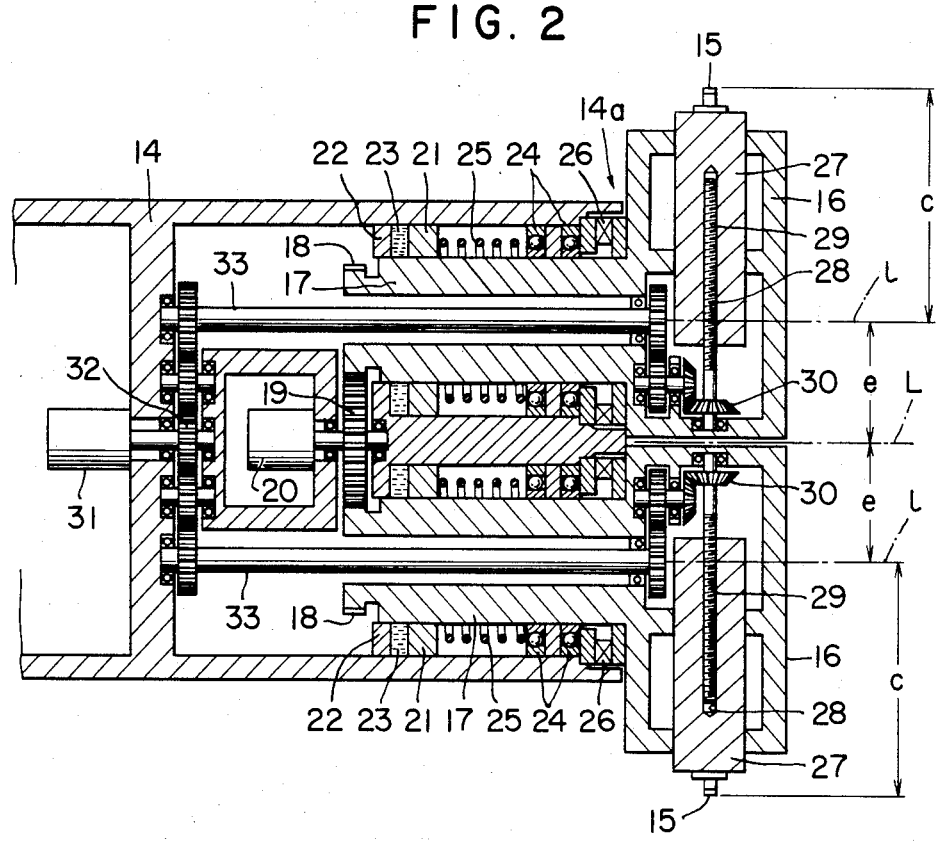
FIG. 2 is an enlarged longitudinal sectional view of the front end portion of a spindle of the boring machine shown in FIG. 1.

FIG. 2 shows an enlarged sectional view of the front end portion 14a of the spindle 14, and at the endmost portion of the front end 14a of the spindle 14, a pair of swing arms 16 are secured to be swingable about axes l of shafts 33 which are positioned with distances e apart from the axis L of rotation of the boring spindle 14 in the radial direction. The swing arms 16 are elongated cylindrical members which extend radially from the rotation axis L of the spindle and the rear end portions of the swing arms 16 are coupled to rotary shafts 17 rotatably fitted into the spindle 14 to be parallel with the rotation axis L. The swing arms 16 are rotated by an electric motor 20 assembled in the spindle 14. A gear 19 driven by the motor 20 meshes with gears 18 secured to the rear end portions of the rotary shafts 17.

Flange members 21 are secured at the intermediate peripheral portions of the shafts 17 so that the outer surfaces of the respective flanges 21 contact with the inner wall of the spindle 14 when the shafts 17 are rotated. A flange member 22 is secured to the inner wall of the spindle 14 so as to slidably contact with the outer surfaces of the shafts 17 to thereby define oil chambers 23 at the peripheral portions between the flanges 21 and 22. O-rings, for example, may be used for providing oil seals therebetween. Bearing members 24 for supporting the rotation shafts 17 to be linearly slidable are disposed around the rotary shafts 17 at positions on the side of the flanges 21 opposite to the flange 22 and spring members 25 are interposed between the flanges 21 and the bearings 24. Curvic (Trade Name: Gleason Works, U.S.A.) coupling members 26 are disposed between the bearings 24 and rear end portions of the swing arms 16 so as to enable the connection or disconnection between the swing arms 16 and the spindle 14.

Each swing arm 16 is provided with an inner radial hollow portion in which a ram 27 can be fitted to be movable in a radial direction with respect to the axis L of the spindle 14. A cutter 15 is attached to the front end of each ram 27 so as to project from the swing arm 16 towards the moving direction of the ram 27 in accordance with the forward movement of the ram 27. The ram 27 is provided with a threaded hole 28 extending in the movable direction or the longitudinal direction of the ram 27 from the rear end thereof, and a screw rod 29 is screwed into the hole 28. The screw rod 29 is secured to a bevel gear 30 at its rear end and rotated by the operation of a motor 31 through a gear train 32, a rotary shaft 33 extending through the shaft 17, and the bevel gear 30 through a gearing secured to the shaft 33. A ram driving mechanism comprising these members and gears is incorporated within the spindle 14.

The operation of the boring machine according to this invention will be described hereunder.

The swing arms 16 are rotated by feeding pressurized oil into the oil chambers 23 to forwardly push the flanges 21 whereby the rotary shafts 17 slide against the force of the springs 25 and the connection between the coupling members 26 and the shafts 17 is cut off, and then the motor 20 is energized to rotate the shafts 17 through the gears 18 and 19, thus rotating the swing arms 16 about the axes l of the shafts 33.

Figure 3A:
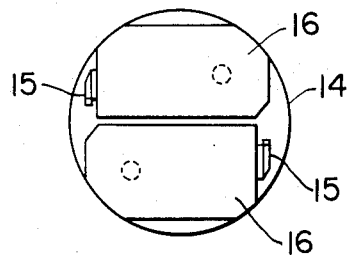
FIGS. 3A through 3D show conditions in which swing arms attached to the front end of the spindle are rotated by predetermined angles.
Figure 3B:
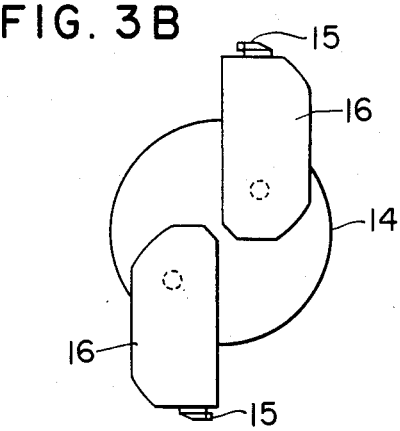
Figure 3C:
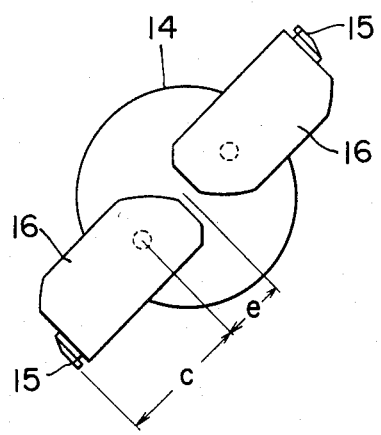
Figure 3D:
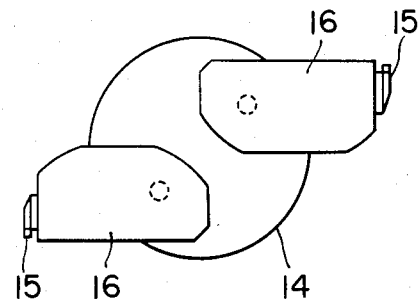

FIGS. 3A through 3D show the rotary conditions of the swing arms 16, in which FIG. 3A shows the condition of the rotating angle of zero in which the cutters 15 are positioned within the outer periphery of the spindle 14. In this condition, although the cutters 15 carry out no cutting operation, since the cutting radius of the cutter is the shortest, the spindle 14 can be inserted into the bore of the workpiece having a small opening. FIG. 3B shows the condition in which the swing arms 16 are rotated by 90° in which the cutters 15 extend outwardly beyond the outer periphery of the spindle 14. Then, the inner peripheral surface of the workpiece can be cut with a radius corresponding to a distance between the axis L and the blade end of the cutter 15 when the spindle 14 rotates. FIG. 3C shows a condition in which the swing arms have rotated by 135° in which the cutting radius becomes the maximum and FIG. 3D shows a condition of rotation of 180°.

As described above, the swing arms 16 can be rotated by any desired angle so that the cutters 15 can cut the workpiece W with any desired radius below the maximum radius of the distance e+c, wherein e designates a distance between the axes L and l and c designates the shortest distance between the axis l and the blade end of the cutter 15.

After the swing arms 16 have been rotated by any desired angle, by discharging the pressurized oil from the oil chambers 23 the rotary shafts 17 are caused to backwardly slide in the spindle 14 by the force of the springs 25 and connected to the coupling members 26 to, thereby connecting the swing arms 16 to the spindle 14. When the spindle 14 is then rotated by the driving mechanism 13, the swing arms 16 are also rotated to cut the inner peripheral surface of the workpiece W with the desired radius.

During the operation of the swing arms 16 described above, although the rams 27 with cutters 15 at their front ends are accommodated in the hollow portions of the respective swing arms, the cutters 15 can be directly supported by the front ends of the swing arms 16 in a case where the rams 27 are not accommodated in the swing arms 16.

Figure 4:
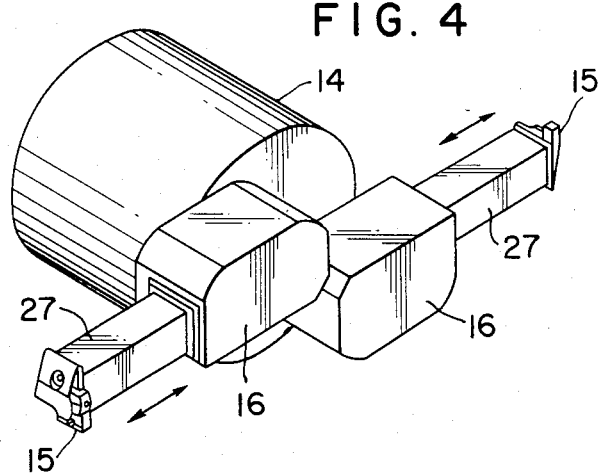
FIG. 4 is a perspective view showing the front end of the spindle in which rams accommodated in the swing arms extend in radial directions.

The rams 27 slidably move to advance the cutters 15 in the following manner. After the swing arms 16 have been rotated by a predetermined angle or in a condition where the swing arms 16 are not rotated as shown in FIG. 3A, when the motor 31 is driven to rotate the bevel gears 30 through the gear train 32, the shafts 33, and the gearings, the screw rods 29 attached to the bevel gears 30 are rotated. The rotation of the screw rods 29 is converted into the sliding axial movement of the rams 27 through the engagement of the holes 28 and the screw rods 26. FIG. 4 shows a perspective view showing the protruded state of the rams 27, in which the rams 27 are moved forwardly after the swing arms 16 have been rotated by 90°. The adjustment of the feed amounts of the rams 27 can be performed by controlling the rotation angle of the motor 31.

Minor adjustment of the cutters 15 at the front ends of the rams 27 can of course be made by a known manner.

According to this invention, the cutting radii of cutters can be changed as desired by changing rotation angles of swing arms and also by forwardly moving rams located in the respective swing arms. Moreover, the cutting radii of the cutters can further be widely changed by combining the rotation of the swing arms with the forward movement of the rams in the manner described above. Thus, a workpiece can be cut with any desired radii of the cutters without changing them, which can largely improve the working efficiency and reduce the working time. In addition, at the time of cutting the inner surface of a small opening of a workpiece, the cutters can be inserted into the opening with the smallest radius and then the radius can be increased in the opening. Particularly, with a splittable casing, the inner cutting operation can be continuously done for different diameters in an assembled condition of the splittable casing. Thus, the working accuracy such as concentricity as well as working efficiency can be largely improved.

We claim:

1. In a hollow rotary spindle of a boring machine provided with a pair of swing arms attached to the front end of the rotary spindle and adapted to support cutters and also provided with a driving mechanism disposed within the rotary spindle for driving the swing arm, the improvement in which said pair of swing arms extend in symmetric radial directions with respect to said rotary spindle and are rotated about the axis thereof and a pair of rams are disposed respectively within said swing arms to be movable in radial directions of said swing arm so as to extend beyond the front ends thereof, said cutters being secured at the front ends of said rams, said rotary spindle being further provided therein with a driving mechanism for driving said rams, said ram being further provided with threaded holes extending in the longitudinal direction, and said ram driving mechanism comprising an electric motor disposed within said rotary spindle, a gear mounted on a drive shaft of said motor, rotary shafts provided with rear gears meshed with said gears, bevel gears operatively connected to said rotary shafts through gearings, and screw rods secured to said bevel gears to engage with said threaded inner holes of said rams.

* * * * *